(12) United States Patent
Alvey et al.

(10) Patent No.: US 11,029,044 B2
(45) Date of Patent: Jun. 8, 2021

(54) HIGH VOLUME AIR STREAM WATER RECOVERY SYSTEM

(71) Applicant: United States of America as Represented by The Secretary of The Army, Alexandria, VA (US)

(72) Inventors: Jedediah B Alvey, Savoy, IL (US); Martin A Page, Mahomet, IL (US); Axy Pagan-Vasquez, Middletown, RI (US)

(73) Assignee: UNITED STATES of AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 116 days.

(21) Appl. No.: 15/815,630

(22) Filed: Nov. 16, 2017

(65) Prior Publication Data
US 2019/0145638 A1    May 16, 2019

(51) Int. Cl.
| | |
|---|---|
| *B01D 53/00* | (2006.01) |
| *F24F 3/14* | (2006.01) |
| *B01D 53/26* | (2006.01) |
| *C02F 1/10* | (2006.01) |
| *C02F 1/16* | (2006.01) |
| *E03B 3/28* | (2006.01) |
| *B01D 1/14* | (2006.01) |
| *B01D 53/06* | (2006.01) |
| *B01D 5/00* | (2006.01) |

(52) U.S. Cl.
CPC .............. *F24F 3/1411* (2013.01); *B01D 1/14* (2013.01); *B01D 5/006* (2013.01); *B01D 53/06* (2013.01); *B01D 53/261* (2013.01); *B01D 53/265* (2013.01); *C02F 1/10* (2013.01); *C02F 1/16* (2013.01); *E03B 3/28* (2013.01); *F24F 2003/144* (2013.01)

(58) Field of Classification Search
CPC ..... F24F 3/1411; F24F 2003/144; C02F 1/10; C02F 1/16; E03B 3/28; B01D 1/14; B01D 53/06; B01D 5/006; B01D 53/261; B01D 53/265

See application file for complete search history.

(56) References Cited

U.S. PATENT DOCUMENTS

| | | | | |
|---|---|---|---|---|
| 2,026,935 A | * | 1/1936 | Downs | F24F 3/1411 95/91 |
| 3,062,516 A | * | 11/1962 | Hickman | C02F 1/10 261/22 |
| 3,257,738 A | * | 6/1966 | Margittai | A23L 3/40 34/473 |
| 3,288,448 A | * | 11/1966 | Patterson | B01D 53/26 96/184 |
| 3,305,456 A | * | 2/1967 | Broughton | C02F 1/02 203/11 |
| 4,209,364 A | * | 6/1980 | Rothschild | B01D 3/10 203/11 |

(Continued)

*Primary Examiner* — Dung H Bui
(74) *Attorney, Agent, or Firm* — Brian C. Jones

(57) ABSTRACT

The invention is a water recovery system that utilizes waste heat and a moving air stream to recover water with minimal use of energy and without the need to move water through filtration devices. The invention may be used for recovery and reuse of water for a wide range of emergency back-up, environmental, industrial, and mission-oriented purposes.

6 Claims, 4 Drawing Sheets

(56) References Cited

U.S. PATENT DOCUMENTS

| | | | | |
|---|---|---|---|---|
| 6,156,102 A | * | 12/2000 | Conrad | B01D 53/18 95/172 |
| 7,601,206 B2 | | 10/2009 | Call et al. | |
| 2013/0118888 A1 | | 5/2013 | Ghosh et al. | |
| 2013/0319245 A1 | | 12/2013 | Ball et al. | |
| 2016/0320079 A1 | * | 11/2016 | Moghaddam | F25B 25/005 |

* cited by examiner

HIGH VOLUME AIR STREAM WATER RECOVERY SYSTEM

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of liquid purification or separation and more specifically to a phase change separator with renewable energy integration and heat recovery means.

BACKGROUND OF THE INVENTION

There are a number methods known in the art for obtaining potable water by removing water vapor from the ambient air by heating and cooling the air stream.

These methods generally involve forming an interface with an ambient airstream over a cool surface to condense the water vapor, and may involve the use of desiccant materials.

The use of desiccants is also known for extracting water from air. For example, U.S. patent application Ser. No. 13/660,499 filed by James Ball, et. al discloses a system in which ambient air is passed through a chamber containing a desiccant-soaked media. As the air passes in contact with the media, moisture from the air stream is removed by absorption into the desiccant. Heat is then applied to the desiccant media to vaporize the captured moisture. The water vapor is transported away from the chamber, and then is condensed and collected. The amount of water collected by this system depends on the humidity levels in the ambient air.

Water recovery systems known in the art that utilize ambient air streams are energy intensive and require substantial energy to heat and cool the ambient air stream, relative to the yield produced.

It is desirable to have an energy efficient system which does not require substantial energy to regulate the temperature of a moving air stream and which can produce a volume of useable water.

SUMMARY OF THE INVENTION

The invention is a novel water recovery system that recovers water from waste using a moving air stream that is heated with waste heat. The system efficiently extracts water vapor from waste materials having recoverable water content (e.g., wastewater, brine, sludge) through accelerated evaporation processes and desiccant materials.

Various embodiments may include alternative components for accelerating evaporation from a waste source and transfer of the water content to a moving air stream.

The invention includes a moving air stream which moves along a direct path. This direct path comes into contact with various components to form highly controlled interface points, including a waste material heating interface, a desiccant material interface, and a cooling interface.

The invention also includes components which capture water in a condensate collection area. Temperature and speed of the air stream are regulated and adjusted at the interface points to optimize the ratio of energy usage to water yield, relative to the amount of waste captured or processed.

BRIEF DESCRIPTION OF SEVERAL VIEWS OF THE DRAWING(S)

TERMS OF ART

As used herein, the term "conduit" means a structure through which a gas or liquid flows.

As used herein, the term "desiccant material" means a liquid, solid or gas material that absorbs moisture. Examples of desiccant material may include, but are not limited to, montmorillonite clay, silica gel, indicating silica gel, molecular sieve, calcium oxide, and calcium sulfate, or any naturally occurring or manufactured absorbent material.

As used herein, the term "dew point" means the temperature that will cause water vapor in a stream of air to condense.

As used herein, the term "interface" means a point of physical contact and/or transformation caused by physical interaction or contact between two or more materials or phases of matter; an interface may include contact with an air stream, contact with a material, contact with the inner or outer surface of a structure, and contact with a fluid surface.

As used herein, the term "waste heat" means heat that is emitted by an apparatus as a result of the apparatus performing a function other than providing heat for a water recovery system.

DETAILED DESCRIPTION OF THE INVENTION

Figure 1:
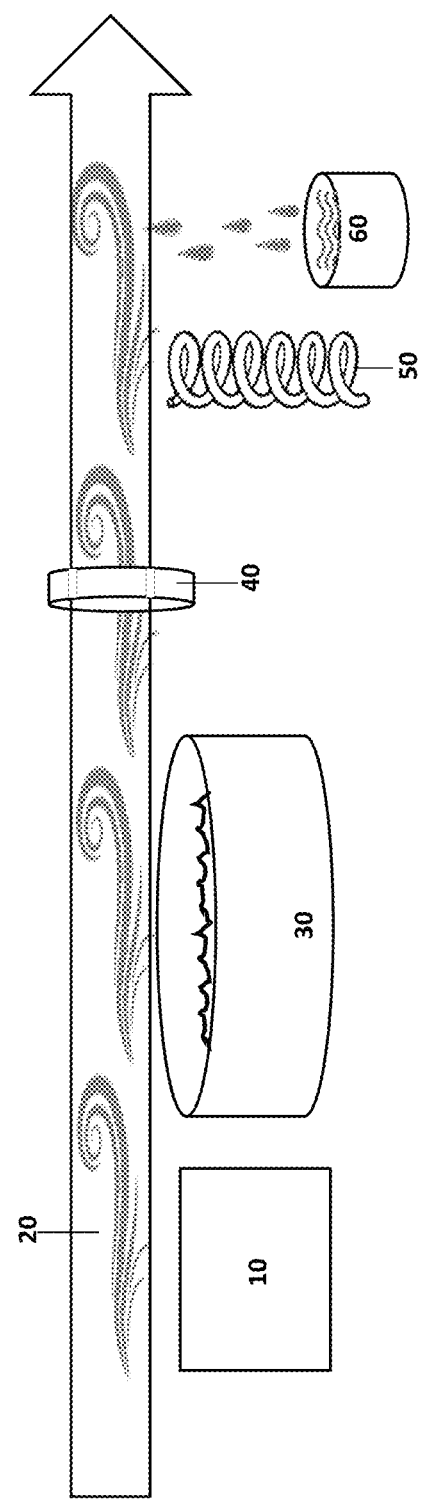
FIG. 1 is a functional diagram of a water recovery system, which recovers water content from waste using waste heat and a moving air stream.

FIG. 1 is a functional diagram of water recovery system 100 which recovers water content from waste using waste heat and moving air stream. In various embodiments, System 100 may include heat source component 10, moving air stream 20, waste material interface 30, desiccant material 40, cooling interface 50, and condensate collection area 60.

In the embodiment shown, moving air stream 20 has sufficient speed, pressure, and volume to transmit heat and water vapor. Waste heat source 10 is operatively coupled with moving air stream 20 to heat moving air stream 20. In various embodiments, heat source component 10 may be a renewable, waste, or other heat source, and may be an exhaust stream from an electrical generator. In various embodiments, heat collection may be done actively through a 2-fluid heat exchanger, or passively through a heat pipe configuration.

Waste material interface 30 may be formed from any material known in the art from which water may be recovered. In various embodiments, waste material interface 30 may be contained within a waste receptacle, vat, chamber, or pool having an open surface which comes into contact with moving air stream 20 to form a heating interface where moving air stream comes into contract with waste material interface 30.

Water recovery system 100 may be used for a broad range of substantially or partially liquid or solid waste materials, and may substantially or completely evaporate all liquid content from waste. In various embodiments, solid waste becomes denser and moves away from the waste material surface as moisture is evaporated. Water is evaporated and transported by moving air steam 20 in the form of water vapor. The speed of the air stream may be adjusted to move more rapidly across In various embodiments, heat source component 10 and the waste material interface may be specially configured or separated to mitigate fouling of heat source component 10 or any other heating elements.

The speed of the air stream may be adjusted to move more rapidly across waste material interface 30 to increase the rate of moisture transfer into the air stream.

In various embodiments, moving air stream 20 comes into contact with desiccant material 40 to form a desiccant material interface. Desiccant material interface is an area having a partially enclosed or limited space in which a water vapor is attracted and/or absorbed by desiccant material 40, and reduced in volume (concentrated). Directing moving air stream 20 through desiccant material 40 a second time can transfer concentrated water vapor to moving air stream 20 at a desiccant material interface.

Contact with cooling interface 50 reduces the temperature of moving air stream 20, causing water vapor in moving air stream 20 to condense.

Condensed water is collected in condensate collection area 60.

In various embodiments, system 100 can recover up to a gallon of water per minute, using less than 40 watt-hours of energy per gallon.

Various embodiments may require additional power sources for powering pumps, blowers, a motor that turns a desiccant wheel, and/or sensors that may or may not be present.

In various embodiments, the desiccant containment apparatus is a wheel structure consists of a circular honeycomb matrix of heat-absorbing material. The desiccant wheel slowly rotated within the process and regeneration air streams of an air-handling system. As the thermal wheel rotates, moisture is picked up from the process air stream in one half of the rotation and given up to the regeneration air stream in the other half of the rotation. Thus, moisture from the process air stream is transferred to the matrix material and then from the matrix material to the regeneration air stream, raising the humidity of the regeneration air stream (raising this stream's dew point), while decreasing the humidity of the process stream (lowering this stream's dew point).

The most common desiccant is silica. Other common desiccants include activated charcoal, calcium sulfate (Drierite), calcium chloride, and molecular sieves (typically, zeolites). The performance of any desiccant varies with temperature and both relative humidity and absolute humidity.

Figure 2A:
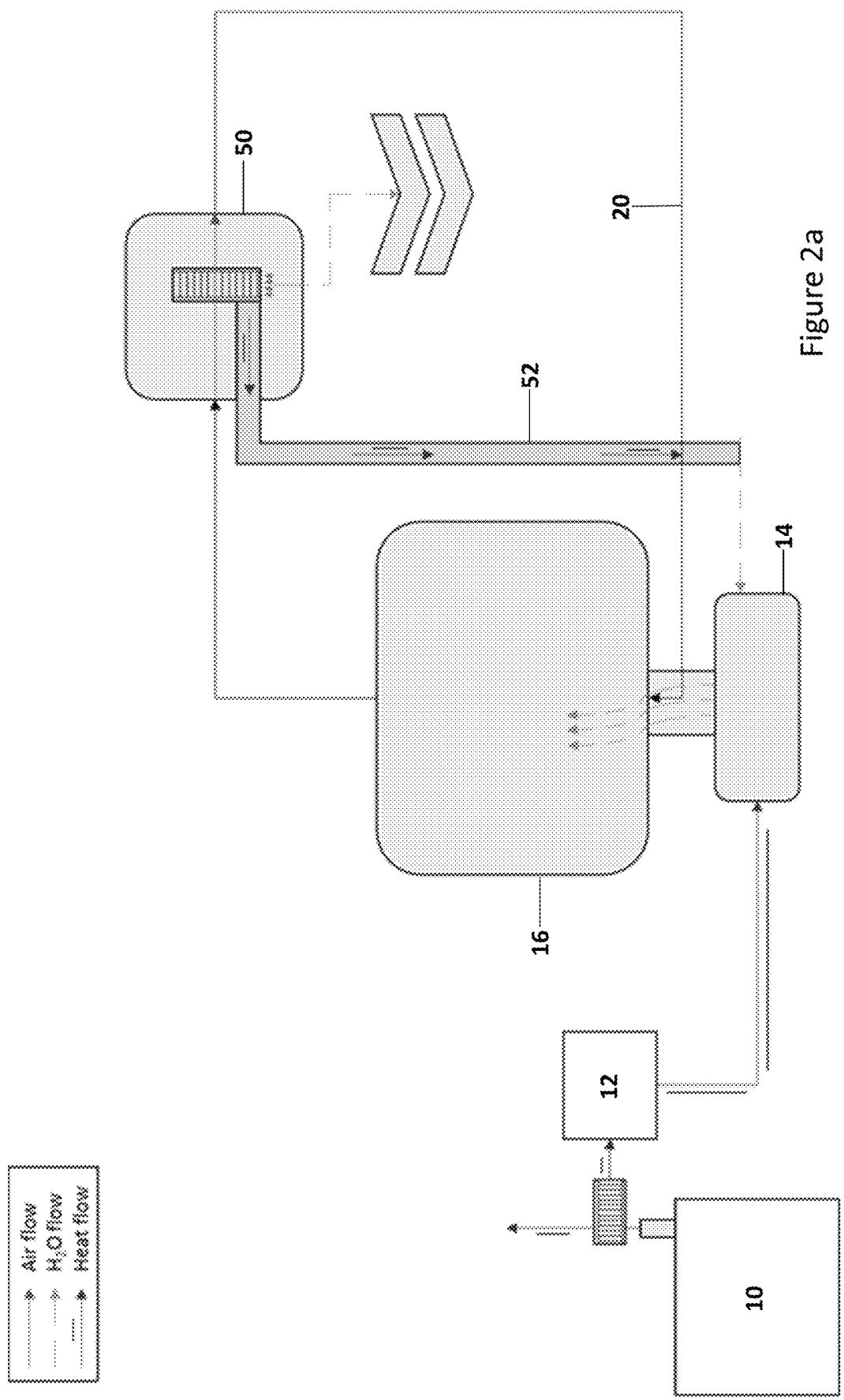
FIG. 2a is an exemplary embodiment of a water recovery system, which utilizes waste heat to recover water from waste material stored in tanks.

FIG. 2*a* is an exemplary embodiment of water recovery system 200, which utilizes waste heat to recover water from waste material stored in tanks.

Exemplary system 200 includes heat source component 10, heat conduit 12, drying chamber 14, evaporation tank 16, moving air stream 20, cooling interface 50, and heat pump 52.

In the embodiment shown, the generation of moving air stream 20 may occur passively by use of a thermal gradient where heated air will rise and cooled air will descend, or actively by the use of blowers or fans to direct moving air stream 20.

In the embodiment shown, system 200 transmits heat from heat source component 10 through heat conduit 12. Heat is transferred from heat conduit 12 to cause evaporation from waste material contained in drying chamber 14. In various embodiments, the waste material may be waste, waste water, brine, sludge, or other waste materials having recoverable water content.

Evaporation chamber 16 utilizes waste heat to efficiently extract water vapor from wastewater, brine, or sludge without losing heat to the environment. In various embodiments, the waste material may be flowing continuously through drying chamber 14 or it may be loaded one batch at a time.

In various embodiments, drying chamber 14 may have a depth between 6 inches and several feet to accommodate a varying volume of waste material. In various embodiments, drying chamber 14 detaches from system 200 for easy removal of solids formed by evaporating waste material.

Moving air stream 20 comes into contact with cooling interface 50. In the embodiment shown, cooling interface 50 is a substantially enclosed tank or chamber with a temperature that is lower than the dew point temperature of moving air stream 20.

In various embodiments, cooling interface 50 includes a compressor, an expansion valve, a sprayer, and/or a fan.

In various embodiments, cooling interface 50 achieves condensation of water vapor by using components known in the art such as a heat pipe, heat pump, liquid cooling coil, and/or desiccant dehumidification.

In the exemplary embodiment shown, heat pump 52 transfers heat from cooling interface 50 to moving air stream 20 before it encounters waste material in drying chamber 14.

In various embodiments, system 200 may include a continuously moving air stream or a heat conduit that recovers the heat of condensation from the condensation chamber and transfers it back to the waste-air stream interface.

In various embodiments, brine, sludge, or other wet material is sprayed into the downstream end of cooling interface 50 to provide cooling and enhance condensation.

Other embodiments of system 200 may utilize convection fans to create air circulation that provides cooling and enhances condensation.

In various embodiments, condensed water is collected from cooling interface 50 in a condensate collection receptacle. In various embodiments, the collected water is filtered. The dry air exiting cooling interface 50 is recycled through evaporation chamber 16 to aid in the evaporation of waste material.

Various embodiments of system 200 include sensors for detecting temperature and humidity of moving air stream 20 as it enters and exits cooling interface 50. Comparing the temperature and humidity of the high humidity air stream entering cooling interface 50 to the temperature and humidity of the dry air stream exiting cooling interface 50 can be used to calculate the efficiency of cooling interface 50. The output of this efficiency calculation can be used to optimize the temperature of cooling interface 50 and/or the speed of moving air stream 20.

Figure 2B:
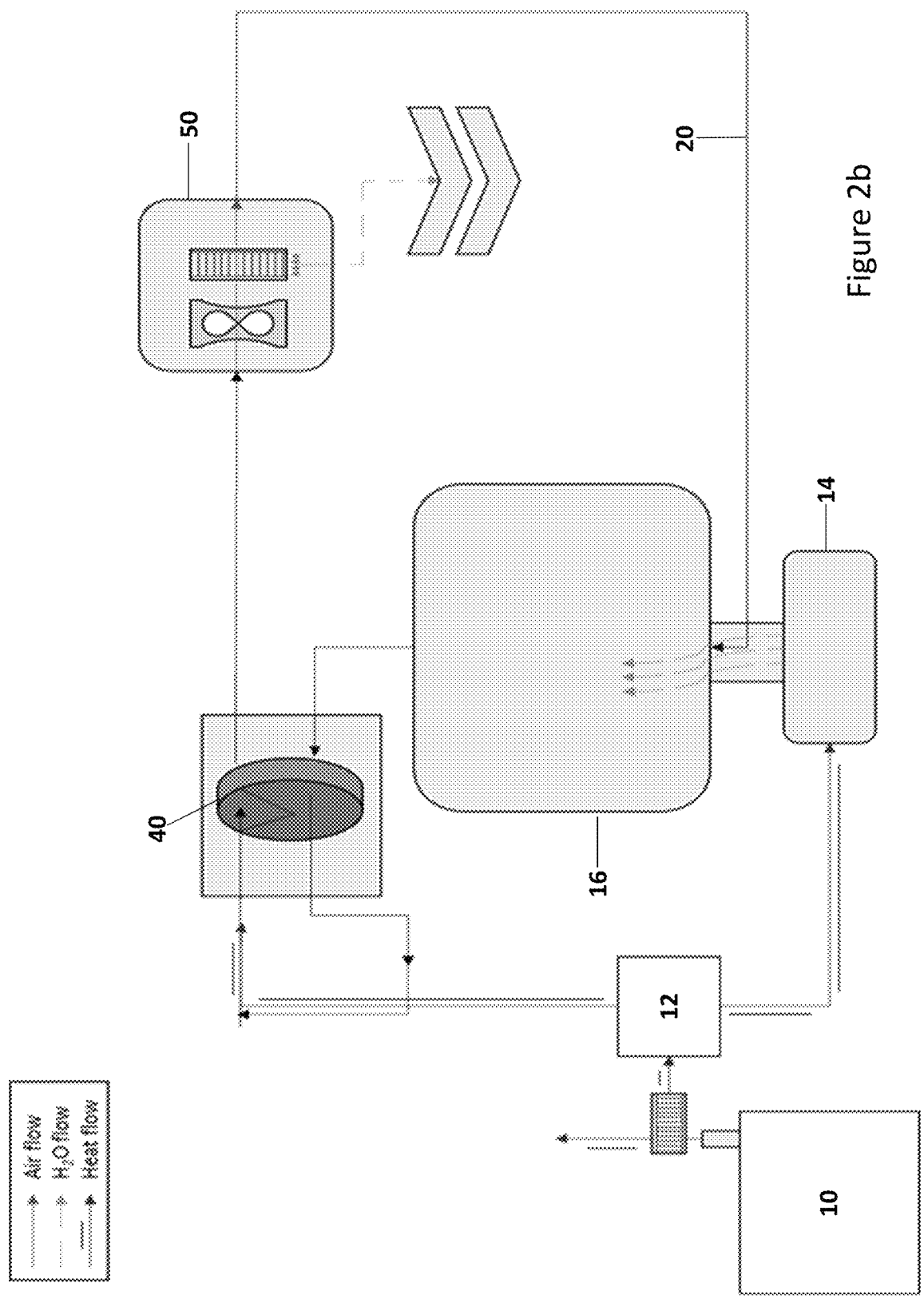
FIG. 2b illustrates an exemplary embodiment of a water recovery system, which utilizes desiccant material to reduce energy usage.

FIG. 2*b* illustrates an exemplary embodiment of water recovery system 200 which utilizes desiccant material to reduce energy usage.

FIG. 2*b* illustrates heat source component 10, heat conduit 12, drying chamber 14, evaporation chamber 16, desiccant material 40, and cooling interface 50.

In the embodiment shown, desiccant material 40 is used to increase the dew point of moving air stream 20.

In this embodiment, moving air stream 20 gathers water vapor in evaporation chamber 16 and moves through a water vapor conduit to desiccant material 40. Then, it flows through the desiccant absorption section. The desiccant absorption section removes the humidity from moving air stream 20 to create a low humidity air stream and concentrate the humidity in the desiccant material.

Then, either the low humidity air stream or ambient air is directed through the desiccant desorption section where it moves the humidity from the desiccant material into moving air stream 20 to create a concentrated high humidity air stream.

The dry air exiting from desiccant absorption section can be discharged from the system into the ambient atmosphere, or it can be heated from the collected waste heat prior to being passed through the desiccant desorption section.

In various embodiments, system 100 includes alternative heat exchanger components that transfer heat from heat conduit 12 to heat ambient air or low humidity air entering the desiccant desorption section. When heated low humidity air passes through the desiccant desorption section, the heat extracts moisture from the desiccant material and recycles (i.e. regenerates) desiccant material for future use.

The concentrated stream of high humidity air is then transferred through a water vapor conduit to cooling interface 50. In order to extract liquid water from the stream of high humidity air, the temperature of cooling interface 50 must be lower than the dew point temperature of the high humidity air stream.

In various embodiments, when a desiccant material chamber is used to generate a concentrated high humidity air stream, an air-cooled heat exchanger cools the air in the condensation chamber to drive condensation. In these embodiments, the heat of condensation is lost to the ambient environment.

The condensed water is collected from cooling interface 50. In various embodiments, the collected water is filtered. The dry air exiting cooling interface 50 is recycled through the evaporation chamber 16 to aid in the evaporation of waste material.

Figure 3:
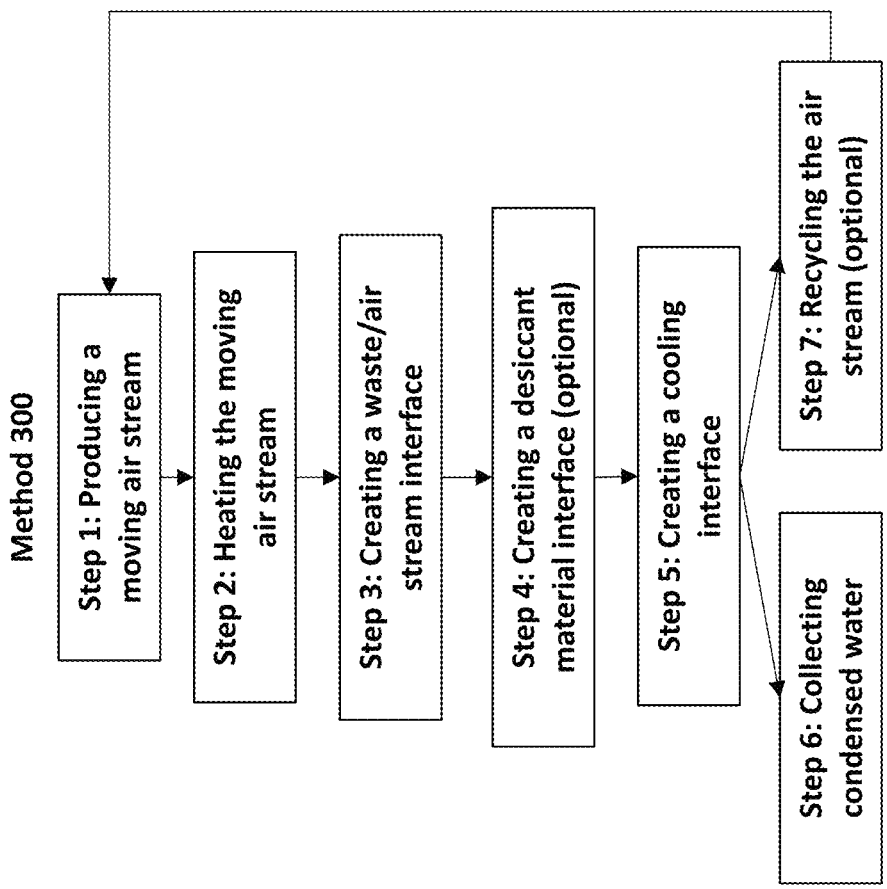
FIG. 3 illustrates an exemplary method for recovering water.

FIG. 3 illustrates exemplary method 300 for recovering water.

Step 1 is the step of producing a moving air stream.

The moving air stream must have sufficient speed, pressure, and volume to transmit heat and water vapor. In various embodiments, fans or blowers produce the moving air stream. In alternative embodiments, a thermal gradient produces the moving air stream by heating air and causing it to rise or cooling air and causing it to descend.

Step 2 is the step of heating the moving air stream.

A heat conduit transfers heat from a heat source to the moving air stream. In various embodiments, the heat conduit is comprised of heat pipes that passively transfer heat. In other embodiments, the heat conduit is comprised of a heat exchanger that actively transfers heat.

Step 3 is the step of creating a waste/air-stream interface. The heated moving air stream interfaces with the waste material and heats the waste material to produce water vapor. This water vapor increases the humidity content of the moving air stream.

Step 4 is the optional step of creating a desiccant material interface.

This step increases the effective dew point of the high humidity air stream, which increases the maximum temperature at which the cooling interface can create condensation.

In various embodiments, the high humidity moving air stream flows through the desiccant absorption section of the desiccant material. The desiccant material removes the humidity from the moving air stream to create a low humidity air stream and concentrate the humidity in the desiccant material.

Then, the low humidity air stream or ambient air is directed through the desorption section of the desiccant material where it removes the humidity from the desiccant material to create a concentrated high humidity air stream with an increased dew point.

In various embodiments, a heat conduit may transfer heat into the low humidity air stream or ambient air before it enters the desorption section of the desiccant material, in order to heat the air stream. The heated air stream heats the desiccant material to move moisture from the desiccant material into the moving air stream to create a concentrated humidity air stream; this heat also regenerates the desiccant material (i.e. recycles the desiccant material for future use).

Step 5 is the step of creating a cooling interface.

In various embodiments, the moving air stream is directed proximally to cooling devices or material to lower the temperature of the moving air stream. Lowering the temperature of the moving air stream may condense the water vapor contained in the moving air stream.

Step 6 is the step of collecting condensed water created by cooling the moving air stream. In various embodiments, condensed water may be collected in a condensate collection receptacle.

Step 7 is the optional step of recycling low humidity air, to repeat Method 300.

Step 7 is the optional step of redirecting the moving air stream to be re-heated and re-cooled.

What is claimed is:

1. A water recovery apparatus comprised of: a component for generating a moving air stream with sufficient speed, pressure, and volume to transmit heat and water vapor; a waste heat component for heating said moving air stream; a a heat conduit 12 coupled to a detachable drying chamber 14 having an open surface and containing a quantity of waste material having a recoverable water content, said waste material selected from the group consisting of waste, waste water, brine, sludge or other waste materials having recoverable water content, wherein said waste material forms a heating interface with said moving air stream; said drying chamber being coupled to an evaporation chamber 16 for utilizing aid waste heat to efficiently extract water from said waste material without losing heat to the environment, a cooling interface to reduce the temperature of said moving air stream as said moving air stream moves across said cooling interface; and a condensate collection area wherein said apparatus can recover water using less than 40 watt-hours of energy per gallon.

2. The apparatus of claim 1, wherein said moving airstream is continuously moving.

3. The apparatus of claim 1, wherein said moving air stream is continuously recirculated.

4. The apparatus of claim 3, wherein heat emitted from said cooling interface is used to heat said moving air stream.

5. The apparatus of claim 1, wherein said component for generating a moving air stream is selected from a group consisting of: a fan, a blower, a mechanical generator, a wind capture device, a hydro-powered device, a solar-powered device, an electrically-powered device, and a thermal gradient.

6. The apparatus of claim 1, which further includes a desiccant material interface.

\* \* \* \* \*